(12) United States Patent
Fan et al.

(10) Patent No.: US 11,760,659 B2
(45) Date of Patent: Sep. 19, 2023

(54) SYSTEM AND PROCESS FOR SEPARATING SAND AND GRAVEL IN SEDIMENTS OF SEWAGE PIPE NETWORK AND RECYCLING ORGANIC MATTERS

(71) Applicant: North China Municipal Engineering Design & Research Institute Co., Ltd., Tianjin (CN)

(72) Inventors: Bo Fan, Tianjin (CN); Yongli Sun, Tianjin (CN); Xingcan Zheng, Tianjin (CN); Pengfeng Li, Tianjin (CN); Ying Mu, Tianjin (CN); Peng Huang, Tianjin (CN); Wei Shang, Tianjin (CN)

(73) Assignee: North China Municipal Engineering Design & Research Institute Co., Ltd., Tianjin (CN)

( * ) Notice: Subject to any disclaimer, the term of this patent is extended or adjusted under 35 U.S.C. 154(b) by 0 days.

(21) Appl. No.: 18/174,018

(22) Filed: Feb. 24, 2023

(65) Prior Publication Data
US 2023/0192509 A1    Jun. 22, 2023

(30) Foreign Application Priority Data

Aug. 18, 2022 (CN) .......................... 202210991523.1

(51) Int. Cl.
*C02F 1/00* (2023.01)
*C02F 1/52* (2023.01)

(52) U.S. Cl.
CPC ............ *C02F 1/001* (2013.01); *C02F 1/5209* (2013.01); *C02F 2303/24* (2013.01); *C02F 2303/26* (2013.01)

(58) Field of Classification Search
None
See application file for complete search history.

(56) References Cited

U.S. PATENT DOCUMENTS

| | | | |
|---|---|---|---|
| 2005/0186315 A1* | 8/2005 | Iiyama | A23K 10/32 426/518 |
| 2006/0003064 A1* | 1/2006 | James | A23K 10/30 426/481 |
| 2015/0021247 A1* | 1/2015 | Lin-Hendel | C02F 1/78 210/170.03 |

FOREIGN PATENT DOCUMENTS

| | | |
|---|---|---|
| CN | 205360690 U | 7/2016 |
| CN | 207760235 U | 8/2018 |
| CN | 213950904 U | 8/2021 |

* cited by examiner

*Primary Examiner* — Richard C Gurtowski
(74) *Attorney, Agent, or Firm* — IPRO, PLLC; Na Xu

(57) ABSTRACT

The present disclosure relates to a system and process for separating sand and gravel in sediments of a sewage pipe network and recycling organic matters. The system includes a conveying grid plate, a mud outlet is provided below the conveying grid plate, and a masonry conveying area is provided at one side of the conveying grid plate; a fiber crushing tank, disposed below the mud outlet, and a crushing device is disposed below the mud outlet; a masonry scouring and recycling tank, provided with an interception grille located at one side of the masonry conveying area, a flushing device is disposed above the interception grille, a masonry outlet is provided in the masonry scouring and recycling tank, the masonry scouring and recycling tank is communicated with a muddy water return pipe, and the muddy water return pipe is communicated with the mud outlet.

9 Claims, 1 Drawing Sheet

SYSTEM AND PROCESS FOR SEPARATING SAND AND GRAVEL IN SEDIMENTS OF SEWAGE PIPE NETWORK AND RECYCLING ORGANIC MATTERS

TECHNICAL FIELD

The present disclosure relates to the technical field of sewage treatment, and in particular to a system and process for separating sand and gravel in sediments of a sewage pipe network and recycling organic matters.

BACKGROUND

With the vigorous promotion of the construction of an urban drainage pipe network in China, a great progress has been made in eliminating blank areas of the pipe network and improving the sewage collection and treatment rate. However, during the daily operation of the sewage pipe network in China, serious pipe network deposition caused by high water level and low flow rate still prevails, which leads to problems such as frequent occurrence of black and odorous urban water bodies after rain and extremely low influent concentration of sewage plants.

The drainage pipe network in China has been operating at a state of high water level and low flow rate for a long time. According to surveys, the average flow rate of a sewage pipeline is 0.3 m/s, and up to 85% of the pipe network has a flow rate lower than 0.2 m/s, which is far from reaching the self-cleaning flow rate of 0.6 m/s, so that a large amount of sludge and other pollutants are deposited at the bottom of the pipeline. The sludge contains most of N, P and COD in sewage, and the sewage entering the sewage plants through the pipelines is relatively clear, resulting in low influent concentration of most urban sewage plants in China. The average influent $BOD_5$ concentration in about 68% of the sewage plants is less than 100 mg/L, while the influent $BOD_5$ concentration in foreign sewage plants is generally 200-400 mg/L. The low influent concentration of the sewage plants lead to insufficient efficiency of biological treatment systems, and a large amount of carbon sources need to be added to ensure that the effluent reaches the standard, which increases the cost of sewage treatment for no reason. At the same time, a large amount of pollutants are deposited in the pipe network, which not only encroaches on the pipeline space and reduces the pipeline conveyance capacity, but also will have a scouring effect on the sediments due to the increase of the water volume and flow rate of a drainage pipeline during rainfall. The pollutants that should have entered the sewage plant in dry days will be scoured into the river channel with combined system overflow, causing the black and odorous water body problem after rain. Some studies have shown that the concentration of pollutants in the combined system overflow even exceeds the influent concentration of the sewage plant in the dry season, which is mainly caused by the scouring of the sediments in the drainage pipe network. Therefore, the problems of deposition in the pipeline and extremely low influent concentration of the sewage plant can be solved by cleaning up the sediments in the pipeline and recycling nutrients such as the organic matters to supplement the influent carbon sources of the sewage plant.

As the cities and towns in China are in the stage of large-scale construction and development, there have been irregularities in the construction and management of the drainage pipe network, and a large amount of building materials such as bricks, mud and sand, gravel and soil in the roads, withered trees and other debris enter the drainage pipe network. Therefore, a large amount of inorganic debris with a large proportion is deposited at the bottom of the pipeline, which causes great difficulties for the maintenance of the pipe network and the recycling of the organic matters. The inorganic impurities such as sand and gravel in the sediments need to be effectively removed, before the recycling of the organic matters in the sediments of the pipe network.

SUMMARY

To this end, aiming at the problems that the sediments in the pipeline have a serious impact on the influent of a sewage plant and the water body, and furthermore, the sediments in the pipeline contain a large amount of inorganic sand and gravel, which affects the equipment safety of the sewage plant and the operation and maintenance of the pipeline, the present disclosure provides a system and process for separating sand and gravel in sediments of a sewage pipe network and recycling organic matters, and by removing inorganic matters and recycling the organic matters from the sediments in the pipeline, the influent concentration of the sewage plant can be effectively improved, and the recurring problem that urban water bodies are black and odorous after rain can be avoided.

In order to solve the above-mentioned technical problems, the present disclosure provides a system for separating sand and gravel in sediments of a sewage pipe network and recycling organic matters, which includes:

a transmission type mud feeding area, the transmission type mud feeding area includes a conveying grid plate, a mud outlet is provided below the conveying grid plate, and a masonry conveying area is provided at one side of the conveying grid plate;

a fiber crushing tank, the fiber crushing tank is disposed below the mud outlet, a crushing device is disposed below the mud outlet in the fiber crushing tank, and a bottom of the fiber crushing tank is communicated with a crushed mud-water mixture outlet pipe;

a masonry scouring and recycling tank, the masonry scouring and recycling tank is internally provided with an interception grille located at one side of the masonry conveying area, a flushing device is disposed above the interception grille, the masonry scouring and recycling tank is provided with a masonry outlet at one side of the interception grille, the masonry scouring and recycling tank is internally communicated with a muddy water return pipe at a position below the interception grille, and the muddy water return pipe is communicated with the mud outlet;

a silt sedimentation tank, the silt sedimentation tank includes a mud inlet communicated with the crushed mud-water mixture outlet pipe, the silt sedimentation tank is provided with a sand scraping device at a bottom, the silt sedimentation tank is provided with a water outlet weir on a side wall, and the bottom of the silt sedimentation tank is communicated with a sand discharge pipe;

a pressurized scouring area, the pressurized scouring area includes a mud storage tank, an inlet of the mud storage tank is communicated with the water outlet weir, the mud storage tank is internally provided with a stirrer, and the mud storage tank is communicated with a mud discharge pipeline.

In one implementation of the present disclosure, the system further includes first transmission shafts, the conveying grid plate is provided with the first transmission shafts at two side ends and is driven by the first transmission shafts for transmission.

In one implementation of the present disclosure, the crushing device includes a pair of rotating shafts disposed opposite to each other and rotating in opposite directions, the pair of rotating shafts are located just below the mud outlet, cutting heads are distributed on each rotating shaft, and the cutting heads are alternately disposed on the pair of rotating shafts to form cutting gaps therebetween.

In one implementation of the present disclosure, the flushing device includes a first booster pump and a high-pressure flushing water gun connected with the first booster pump, and the high-pressure flushing water gun is disposed above the interception grille.

In one implementation of the present disclosure, the interception grille is obliquely disposed in the masonry scouring and recycling tank, and the horizontal height of the masonry outlet is less than the horizontal height of the masonry conveying area.

In one implementation of the present disclosure, the horizontal height of the masonry conveying area at the side where the interception grille is located is less than the horizontal height at the side where the conveying grid plate is located.

In one implementation of the present disclosure, the sand scraping device includes a drive motor, a second transmission shaft and a sand scraping plate, an output end of the drive motor is connected to the second transmission shaft, the second transmission shaft is connected to the sand scraping plate, and the sand scraping plate fits the bottom of the silt sedimentation tank.

In one implementation of the present disclosure, the bottom of the silt sedimentation tank is of an inverted cone structure, the sand scraping plate fits a side wall of the inverted cone structure, and the sand discharge pipe is connected to a bottom end of the inverted cone structure.

In one implementation of the present disclosure, a second booster pump is disposed between the mud storage tank and the mud discharge pipeline.

The present disclosure also provides a process for separating sand and gravel in sediments of a sewage pipe network and recycling organic matters by utilizing the system, which includes the following steps:

S1: allowing sediments in a pipeline to enter the transmission type mud feeding area, and intercepting a first separated substance in the sediments in the pipeline by means of the conveying grid plate, the grid spacing of the conveying grid plate is not greater than 1 cm, the intercepted first separated substance falls into the masonry scouring and recycling tank through the masonry conveying area, and a second separated substance in the sediments in the pipeline falls into the mud outlet through the conveying grid plate and enters the fiber crushing tank;

S2: shearing and crushing the second separated substance by means of the crushing device below the mud outlet to obtain a third separated substance, a cutting gap in the crushing device is 1-2 cm;

S3: flushing the first separated substance on the interception grille by using the flushing device and then discharging through the masonry outlet; after flushing, separating a fourth separated substance from the first separated substance; allowing the fourth separated substance to pass through the interception grille and flow back to the fiber crushing tank through the muddy water return pipe to mix with the third separated substance; and mixing to obtain a fifth separated substance;

S4: allowing the fifth separated substance to enter the silt sedimentation tank through the crushed mud-water mixture outlet pipe and the mud inlet, and staying in the silt sedimentation tank for 60-100 s; scraping off a sixth separated substance precipitated to the bottom of the silt sedimentation tank from the fifth separated substance by means of the sand scraping device and then discharging through the sand discharge pipe; discharging a remaining seventh separated substance in the fifth separated substance from the water outlet weir, entering the subsequent pressurized scouring area and storing in the mud storage tank; and S5: stirring the seventh separated substance in the mud storage tank by means of the stirrer, and discharging outside through the mud discharge pipeline.

Compared with the prior art, the above-mentioned technical solutions of the present disclosure has the following advantages:

The system and process for separating the sand and gravel in the sediments of the sewage pipe network and recycling the organic matters provided by the present disclosure can separate the inorganic impurities from the sediments pumped out from the pipeline, collect a remaining mud-water mixture with higher organic matter content, and can be used for scouring the downstream pipeline, thus further reducing the depth of subsequent sediment siltation in the pipeline; therefore, the deposition and siltation in the pipe network can be effectively improved, and the inorganic impurities such as bricks, sand grains and stones with a larger proportion can also be obviously removed. The effective circulation of organic pollutants in the pipeline is achieved, the phenomenon that redeposition encroaches the pipe network is avoided, and a large amount of organic matters would be transported to the sewage plant through the pipe network, so that the influent concentration of the sewage plant can be effectively improved, and the efficiency of the drainage system and the sewage treatment system is improved.

Aiming at the serious problem of pipe network deposition caused by high water level and low flow rate, which is common in the urban drainage pipe network, the present disclosure solves the problem of reduced conveyance capacity caused by pipe network deposition by carrying out inorganic matter separation and organic matter recycling on the sediments removed from the pipeline, also effectively alleviates the problem of black and odor after rain caused by pollutants entering the river scoured by the rain, and further effectively solves the problem of insufficient influent carbon sources of the sewage plant, thus significantly improving the efficiency of the biological treatment system of the sewage plant, greatly reducing the dosage of external carbon sources, and further lowering the operating cost of the sewage plant.

After adoption of the present disclosure, primary screening is performed by using the conveying grid plate to remove the inorganic impurities with larger particle sizes in the sediments in the pipeline, thereby avoiding abrasion and interference to subsequent equipment; and in addition, the muddy organic matters carried by wrapping on the surfaces of the inorganic impurities are scoured and recycled, which improves the recovery efficiency of the organic matters, and also avoids the secondary pollution caused by the viscous organic matters wrapping on the surfaces of bricks, sand grains, stones and the like to the environment in the process of treatment and disposal.

By cutting and crushing a large amount of slender fibrous substances such as dead branches, hairs and plastics in the sediments in the pipeline, the present disclosure avoids the problem that the fibrous substances are easily intertwined and hardened, which affects the stable operation of the subsequent equipment.

Due to the arrangement of the silt sedimentation tank, the present disclosure can enable light sludge to be in a suspended state while effectively settling the inorganic particles with larger proportion, thus retaining the organic matters to the maximum extent, and improving the recycling efficiency of the organic matters.

The present disclosure can effectively alleviate the problem of deposition in the pipeline by pressurizing the stored mud-water mixture and hydraulically scouring the downstream pipeline.

BRIEF DESCRIPTION OF FIGURES

In order to make the content of the present disclosure easier to be understood clearly, the present disclosure will be further described in detail below according to specific embodiments of the present disclosure and in conjunction with the accompanying drawings, in the figures.

Figure 1:
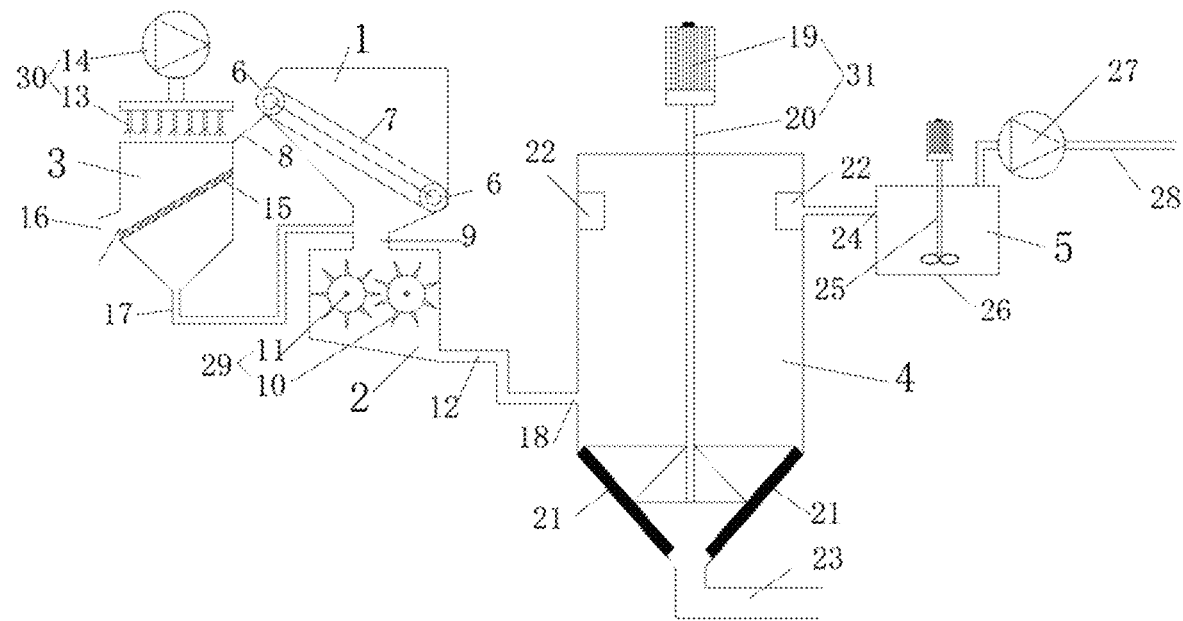
FIG. 1 is a schematic structural diagram of a system for separating sand and gravel in sediments of a sewage pipe network and recycling organic matters according to the present disclosure.
Figure 2:
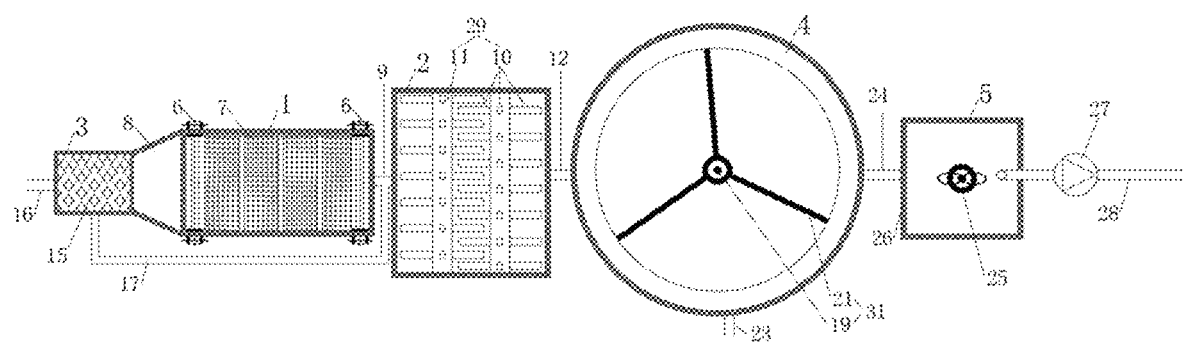
FIG. 2 is a top schematic structural diagram of a system for separating sand and gravel in sediments of a sewage pipe network and recycling organic matters according to the present disclosure.

Description of reference numerals: 1. transmission type mud feeding area; 2. fiber crushing tank; 3. masonry scouring and recycling tank; 4. silt sedimentation tank; 5. pressurized scouring area; 6. first transmission shaft; 7. conveying grid plate; 8. masonry conveying area; 9. mud outlet; 10. cutting head; 11. rotating shaft; 12. crushed mud-water mixture outlet pipe; 13. high-pressure flushing water gun; 14. first booster pump; 15. interception grille; 16. masonry outlet; 17. muddy water return pipe; 18. mud inlet; 19. drive motor; 20. second transmission shaft; 21. sand scraping plate; 22. water outlet weir; 23. sand discharge pipe; 24. inlet, 25. stirrer; 26. mud storage tank; 27. second booster pump; 28. mud discharge pipeline; 29. crushing device; 30. flushing device; and 31. sand scraping device.

DETAILED DESCRIPTION

The present disclosure will be further described below with reference to the accompanying drawings and specific embodiments, so that those skilled in the art can better understand and implement the present disclosure, but the embodiments mentioned are not regarded as limitation of the present disclosure.

Referring to FIG. 1, the present disclosure relates to a system for separating sand and gravel in sediments of a sewage pipe network and recycling organic matters. Generally, the sediments in a pipeline (sediments in a pipe network) include construction wastes such as bricks and stones mixed into the pipeline, garbage such as mud, sand, dead branches and plastic bags entering the pipeline due to being scoured by rainwater, hair, domestic garbage and the like mixed in sewage, and a large amount of organic particulate sediments containing a lot of C, N and P (this part is usually in a form of black sludge, and is light and easily loosen).

The system includes:
a transmission type mud feeding area 1, the transmission type mud feeding area 1 includes a conveying grid plate 7, a mud outlet 9 is provided below the conveying grid plate 7, and a masonry conveying area 8 is provided at one side of the conveying grid plate 7;
a fiber crushing tank 2, the fiber crushing tank 2 is disposed below the mud outlet 9, a crushing device 29 is disposed below the mud outlet 9 in the fiber crushing tank 2, and a bottom of the fiber crushing tank 2 is communicated with a crushed mud-water mixture outlet pipe 12;
a masonry scouring and recycling tank 3, the masonry scouring and recycling tank 3 is internally provided with an interception grille 15 located at one side of the masonry conveying area 8, a flushing device 30 is disposed above the interception grille 15, the masonry scouring and recycling tank 3 is provided with a masonry discharge outlet 16 at one side of the interception grille 15, the masonry scouring and recycling tank 3 is internally communicated with a muddy water return pipe 17 at a position below the interception grille 15, and the muddy water return pipe 17 is communicated with the mud outlet 9;
a silt sedimentation tank 4, the silt sedimentation tank 4 includes a mud inlet 18 communicated with the crushed mud-water mixture outlet pipe 12, the silt sedimentation tank 4 is provided with a sand scraping device 31 at a bottom, the silt sedimentation tank 4 is provided with a water outlet weir 22 on a side wall, and the bottom of the silt sedimentation tank 4 is communicated with a sand discharge pipe 23; and
a pressurized scouring area 5, the pressurized scouring area 5 includes a mud storage tank 26, an inlet 24 of the mud storage tank 26 is communicated with the water outlet weir 22, the mud storage tank 26 is internally provided with a stirrer 25, and the mud storage tank 26 is communicated with a mud discharge pipeline 28.

Specifically, the system further includes first transmission shafts 6, the conveying grid plate 7 is provided with the first transmission shafts 6 at two side ends and is driven by the first transmission shafts 6 for transmission.

Specifically, the crushing device 29 includes a pair of rotating shafts 11 disposed opposite to each other and rotating in opposite directions. The pair of rotating shafts 11 are located just below the mud outlet 9, cutting heads 10 are distributed on each rotating shaft 11, and the cutting heads 10 are alternately disposed on the pair of rotating shafts 11 to form cutting gaps therebetween in a range of 1-2 cm, which can shear and crush the fibrous substances in the mud-water mixture. Since the mud-water mixture contains a large amount of slender fibrous substances such as dead branches, hairs and plastics, these substances can smoothly pass through the conveying grid plate 7, but will be enwinded with the subsequent stirring, lifting, pressurizing and other devices to cause interference. The fibrous substances can be cut and crushed to a length of less than 2 cm by means of the crushing device 29.

Specifically, the flushing device 30 includes a first booster pump 14 and a high-pressure flushing water gun 13 connected with the first booster pump 14, and the high-pressure flushing water gun 13 is disposed above the interception grille 15.

Specifically, the interception grille 15 is obliquely disposed in the masonry scouring and recycling tank 3, and the horizontal height of the masonry outlet 16 is less than the horizontal height of the masonry conveying area 8.

Specifically, the horizontal height of the masonry conveying area 8 at the side where the interception grille 15 is located is less than the horizontal height at the side where the conveying grid plate 7 is located.

Specifically, the sand scraping device 31 includes a drive motor 19, a second transmission shaft 20 and a sand scraping plate 21. An output end of the drive motor 19 is connected to the second transmission shaft 20, the second transmission shaft 20 is connected to the sand scraping plate 21, and the sand scraping plate 21 fits the bottom of the silt sedimentation tank 4.

Specifically, the bottom of the silt sedimentation tank 4 is of an inverted cone structure. The sand scraping plate 21 fits a side wall of the inverted cone structure, and the sand discharge pipe 23 is connected to a bottom end of the inverted cone structure.

Specifically, a second booster pump 27 is disposed between the mud storage tank 26 and the mud discharge pipeline 28.

The present disclosure also provides a process for separating sand and gravel in sediments of a sewage pipe network and recycling organic matters by utilizing the system, which includes the following steps:

S1: sediments in a pipeline is allowed to enter the transmission type mud feeding area 1, and a first separated substance in the sediments in the pipeline is intercepted by means of the conveying grid plate 7, the grid spacing of the conveying grid plate 7 is not greater than 1 cm, the intercepted first separated substance falls into the masonry scouring and recycling tank 3 through the masonry conveying area 8, and a second separated substance in the sediments in the pipeline falls into the mud outlet 9 through the conveying grid plate 7 and enters the fiber crushing tank 2.

In the present embodiment, the first separated substance includes: inorganic impurities (including one or more of bricks, sand grains and stones) and viscous substances wrapping on their surfaces (this part is in a form of black sludge, and is light and easy to loosen); the viscous substances carried by wrapping on surface layers of larger-sized inorganic impurities contain active ingredients such as organic matters; the viscous substances are organic particles or sludge in the sediments in the pipeline; and the pipeline is in an anaerobic environment for a long time, so that microorganisms, metabolites and organic matters form a thicker viscous layer that wraps around the surface layers of the inorganic impurities.

The second separated substance includes slender fibrous substances and small-particle-sized inorganic sand grains and stones (the particle size is less than 1 cm). The slender fibrous substances include one or more dead branches, hairs and plastics.

S2: the second separated substance is sheared and crushed by means of the crushing device 29 below the mud outlet 9 to obtain a third separated substance, a cutting gap in the crushing device 29 is 1-2 cm.

In the present embodiment, the third separated substance includes: crushed slender fibrous substances, and the small-particle-sized inorganic sand grains and stones.

Since the fibrous substances as well as the small-particle-sized inorganic sand grains and stones can smoothly pass through the conveying grid plate 7, the fibrous substances will be enwinded with the subsequent stirring, lifting, pressurizing and other devices to cause interference. The fibrous substances can be cut and crushed to a length of less than 2 cm by means of the crushing device 29, not only is the interference to the subsequent equipment eliminated, but the problems such as reduction of mud and sand separation efficiency caused by entanglement can also be avoided.

S3: the first separated substance is flushed on the interception grille 15 by using the flushing device 30 and then discharged through the masonry outlet 16; after flushing, a fourth separated substance is separated from the first separated substance; the fourth separated substance is allowed to pass through the interception grille 15 and flow back to the fiber crushing tank 2 through the muddy water return pipe 17 to mix with the third separated substance; and mixed to obtain a fifth separated substance.

The fourth separated substance includes the viscous organic particulate sediments separated from the surface layer of the first separated substance via flushing; after being eluted and separated by means of the high-pressure water gun on the interception grille 15, the organic particle sediments can pass through the interception grille 15 smoothly.

The fifth separated substance includes the organic particulate sediments, muddy water, the small-particle-sized inorganic sand grains and stones.

S4: the fifth separated substance is allowed to enter the silt sedimentation tank 4 through the crushed mud-water mixture outlet pipe 12 and the mud inlet 18, and stays in the silt sedimentation tank 4 for 60-100 s; a sixth separated substance precipitated to the bottom of the silt sedimentation tank 4 is scraped off from the fifth separated substance by means of the sand scraping device 31 and then discharged through the sand discharge pipe 23; and a remaining seventh separated substance in the fifth separated substance is discharged from the water outlet weir 22, enters the subsequent pressurized scouring area 5 and is stored in the mud storage tank 26.

The sand scraping plate 21 is driven to rotate by means of the drive motor 19 and the second transmission shaft 20 in the sand scraping device 31, the rotate speed of the second transmission shaft 20 is 1-1.5 m/min, and the sand scraping plate 21 can prevent the precipitated mud and sand from depositing and hardening at the bottom of the silt sedimentation tank 4, which makes the sand discharging process more smooth.

The sixth separated substance includes: precipitated mud and sand (including the small-particle-sized inorganic sand grains and stones).

The seventh separated substance includes: a mud-water mixture (containing muddy water and organic matter components in the muddy water).

S5: the seventh separated substance in the mud storage tank 26 is stirred by means of the stirrer 25, and discharged outside through the mud discharge pipeline 28.

The mud-water mixture can enter the mud storage tank 26 for storage and then be transported to the sewage plant, or directly pressurized by means of the second booster pump 27 to flush the downstream pipeline, thus further alleviating the problem of deposition in the pipeline.

Finally, it should be noted that the above specific embodiments are only used for illustrating the technical solutions of the present disclosure and are not for limitation. Although the present disclosure has been described in detail with reference to examples, those of ordinary skill in the art should understand that the technical solutions of the present disclosure can be modified or replaced equivalently without departing from the spirit and scope of the technical solutions of the present disclosure, which should be included in the scope of the claims of the present disclosure.

What is claimed is:

1. A process of using a system, wherein the system comprises:

a mud feeding area comprising a conveying grid plate with a grid spacing not greater than 1 cm, a mud outlet below the conveying grid plate, and a conveying area at one side of the conveying grid plate;

a first tank below the mud outlet, wherein a bottom of the first tank is fluidly connected with an outlet pipe;

a crushing device below the mud outlet in the first tank, wherein a cutting gap in the crushing device is 1-2 cm;

a second tank comprising an interception grille therein at one side of the conveying area, a flushing device above the interception grille, an outlet at one side of the interception grille, wherein the second tank is fluidly connected with a return pipe at a position below the interception grille, and the return pipe is fluidly connected with the mud outlet;

a third tank comprising a mud inlet fluidly connected with the outlet pipe, a sand scraping device at a bottom thereof, a water outlet weir on a side wall thereof, wherein the bottom of the third tank is fluidly connected with a sand discharge pipe; and a pressurized scouring area comprising a fourth tank, wherein an inlet of the fourth tank is fluidly connected with the water outlet weir, the fourth tank comprises a stirrer, and the fourth tank being is fluidly connected with a mud discharge pipeline;

wherein the process comprises:

allowing sediments in a pipeline to enter the mud feeding area, and intercepting a first separated substance in the sediments with the conveying grid plate, collecting the first separated substance in the second tank, and collecting a second separated substance in the sediments through the conveying grid plate and the mud outlet into the first tank; wherein the first separated substance comprises inorganic impurities and viscous substances on their surfaces; wherein the second separated substance comprises fibrous substances and inorganic sand grains and stones;

shearing and crushing the second separated substance by the crushing device to obtain a third separated substance;

flushing the first separated substance by using the flushing device and then discharging the first separated substance through the outlet; after flushing, separating a fourth separated substance from the first separated substance; allowing the fourth separated substance to pass through the interception grille and flow back to the first tank through the return pipe to mix with the third separated substance; and mixing the fourth separated substance and the third separated substance to obtain a fifth separated substance; the fourth separated substance comprises the viscous substances from the first separated substance, and the fifth separated substance comprises organic particulate sediments, muddy water, inorganic sand grains and stones;

allowing the fifth separated substance to enter the third tank through the outlet pipe and the mud inlet, and setting the fifth separated substance in the third tank for 60-100 s; scraping off a sixth separated substance precipitated to a bottom of the third tank by of the sand scraping device and then discharging the sixth separated substance through the sand discharge pipe; discharging a seventh separated substance remaining in the third tank from the water outlet weir, into a subsequent pressurized scouring area and storing the seventh separated substance in the fourth tank; wherein the sixth separated substance comprises precipitated mud and sand; wherein the seventh separated substance comprises a mud-water mixture; and stirring the seventh separated substance in the fourth tank by the stirrer, and discharging the seventh separated substance through the mud discharge pipeline.

2. The process according to claim 1, wherein the system further comprises first transmission shafts at two side ends of the conveying grid plate; wherein the conveying grid plate is driven by the first transmission shafts.

3. The process according to claim 1, wherein the crushing device comprises a pair of rotating shafts disposed opposite to each other and rotating in opposite directions; wherein the pair of rotating shafts are below the mud outlet; wherein each of the rotating shafts comprises cutting heads alternately disposed on the rotating shafts to form the cutting gap therebetween.

4. The process according to claim 1, wherein the flushing device comprises a first booster pump and a high-pressure flushing water gun connected with the first booster pump, and the high-pressure flushing water gun is above the interception grille.

5. The process according to claim 1, wherein the interception grille is obliquely disposed in the second tank, and a horizontal height of the outlet is less than a horizontal height of the conveying area.

6. The process according to claim 1, wherein a horizontal height of the conveying area at a side where the interception grille is located is less than a horizontal height at a side where the conveying grid plate is located.

7. The process according to claim 1, wherein the sand scraping device comprises a drive motor, a second transmission shaft and a sand scraping plate; wherein an output end of the drive motor is connected to the second transmission shaft, the second transmission shaft is connected to the sand scraping plate, and the sand scraping plate fits the bottom of the third tank.

8. The process according to claim 7, wherein the bottom of the third tank is conical in shape, the sand scraping plate fits a side wall of the bottom of the third tank, and the sand discharge pipe is connected to a bottom end of the bottom of the third tank.

9. The process according to claim 1, wherein the system further comprises a second booster pump is between the fourth tank and the mud discharge pipeline.

* * * * *